Feb. 6, 1962 K. M. GERTEIS 3,020,464
REFRIGERATION SYSTEMS
Filed March 21, 1960

*INVENTOR.*
KARL M. GERTEIS
BY Herman Seid
ATTORNEY.

3,020,464
REFRIGERATION SYSTEMS
Karl M. Gerteis, Syracuse, N.Y., assignor to Carrier Corporation, Syracuse, N.Y., a corporation of Delaware
Filed Mar. 21, 1960, Ser. No. 16,243
9 Claims. (Cl. 318—221)

This invention relates to a refrigeration system including an alternating current motor for operating the compressor of the system and more particularly to a refrigeration system including a compressor driven by a capacitor start single-phase motor having an apparatus for reducing the amount of initial inrush current utilized by the motor.

The vast majority of alternating current motors utilized today in various appliances such as refrigerators, air conditioning systems, etc., are of the single-phase induction type in sizes below 5 H.P. This type of motor has been satisfactory for various applications because of its inexpensive construction and its ability to be modified to satisfy a wide variety of operating requirements. However, with its many advantages the single-phase induction motor has a disadvantage in that the starting current is very much larger than the running current.

Coupled with initial excessive current demands this machine has a further disadvantage when the nature of this demand is considered. The demand comes in the form of an almost instantaneous surge. It can be very well appreciated that utility companies are extremely hard pressed by the current requirement of this type of motor. First of all, the utility company must provide oversize conductors to handle high momentary current and then it must contend with an endless series of high momentary loads. Obviously, it is impossible to anticipate the sporadic demands. As the result of this condition, the generators and distribution system are usually found wanting which results in a consequent reduction in voltage in the power supply lines. The utility companies have established that less difficulty is encountered if the total inrush current is applied in increments or steps with a suitable time delay between steps.

A better understanding of the severity of these sporadic demands is obtained by considering an example such as a refrigeration system. Very often this type of system has not been idle for a very long time so that pressure within the system is not equalized. As a result the compressor of the system must start under an extreme load and, therefore, the motor driving the compressor will require high starting torque. Usually a capacitor start motor is used in this type of system because of its high starting torque characteristic. In a normal refrigeration system, during startup the motor will draw between 250% to 500% of the full load running current utilized by the machine during normal operation. The interval during which this current demand is made is a fraction of a second. It can be clearly seen that the size and length of this demand is very unusual and very difficult to compensate for by the utility company. During recent years, the utility companies, because of the expanded use of similar appliances, have been unable to cope satisfactorily with this situation and have in many localities set up service limitations regarding the type of motors which may be used on their main supply lines.

The chief object of the present invention is to provide a refrigerant compressor having a capacitor motor with a device which will reduce the initial inrush of starting current to the motor.

Another object of the invention is to provide a refrigerant compressor having a capacitor motor with an apparatus which will alter the current demand of the motor from a sudden surge to a stepped increase.

Another object of the invention is to provide a refrigerant compressor having a capacitor motor with time delay means which will hold the run winding circuit open for a short time to reduce the initial inrush of starting current to the motor. Other objects will be readily perceived from the following description.

This invention relates to a refrigerant compressor connected to a capacitor motor which has a run winding and a start winding. In circuit with the run winding there is provided time delay means including a relay for preventing flow of current through the run winding for a short time to reduce the initial inrush of starting current to the motor. The relay may be of the time delay type or a thermistor may be provided in series with the winding of a simple relay to permit closing of the relay only after a short delay.

The attached drawings illustrate a preferred embodiment of the invention in which.

Figure 1:
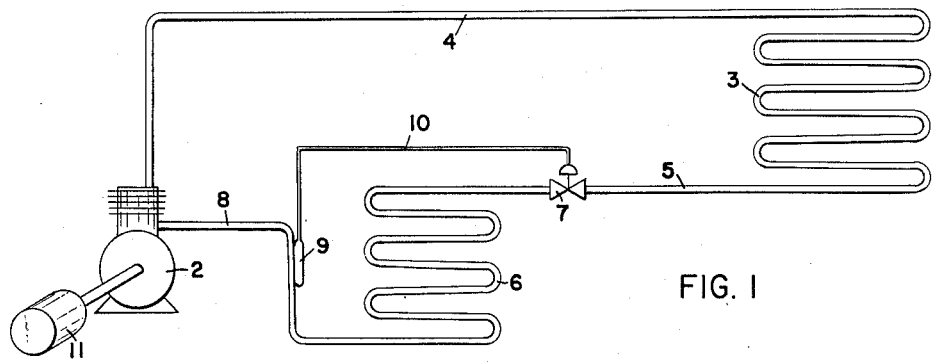
FIGURE 1 is a diagrammatic view of a refrigeration system employing the present invention.

Referring to the drawings there is shown a refrigeration system employing the present invention in which a compressor 2 is connected to a condenser 3 by line 4. Condenser 3 is connected to evaporator 6 by line 5. An expansion valve 7 is placed in the line 5 to meter the flow of refrigerant to the evaporator. The evaporator 6 is connected to compressor 2 by suction line 8. Expansion valve 7 may be operated in response to the temperature of the suction gas leaving the evaporator by means of bulb 9 mounted adjacent the suction line and connected to the expansion valve by means of line 10. Compressor 2 is directly connected to motor 11. Since this type of compressor is subject to intermittent use and because very often the gas pressures within the refrigerant circuit are not equalized a compressor will very often operate against high gas pressure within the high side of the refrigerant circuit requiring great torque to start the compressor. Normally the motor 11 will be of the capacitor type because this particular type of motor has high starting torque characteristics.

Figure 2:
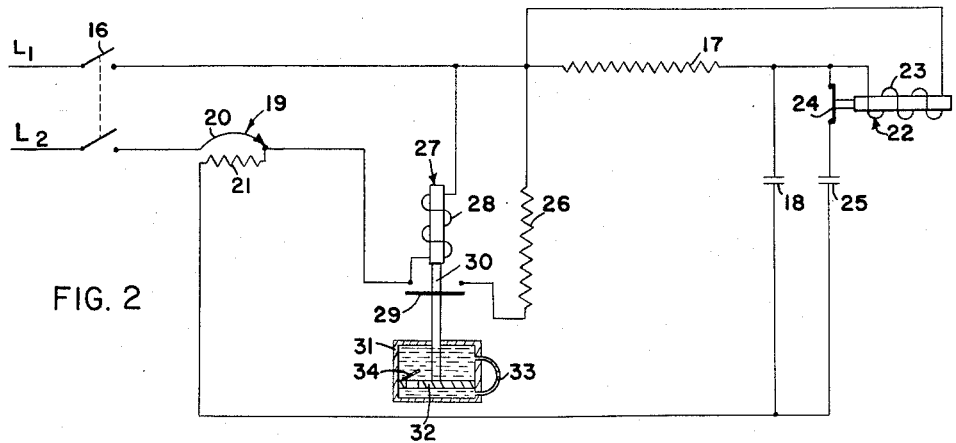
FIGURE 2 is a diagrammatic view of the electrical circuit of the motor used in FIGURE 1.

Referring to FIGURE 2 there is shown a schematic diagram for a capacitor motor employing the present invention. This motor as indicated is a single-phase capacitor start motor. The current is supplied through the lines $L_1$ and $L_2$ into a starter mechanism 16 which normally consists of a pair of contacts which respond to some thermostatic condition which indicates that refrigeration is required. The lines $L_1$ and $L_2$ pass from the starting mechanism to the motor proper. Connected in series with lines $L_1$ and $L_2$ are the start winding 17, run capacitor 18 and the conventional overload protector 19. Overload protector 19 comprises a bimetal 20 and a heater 21. Connected in parellel with the run capacitor 18 are relay 22 and start capacitor 25. The relay 22 comprises a winding or coil 23 and contact 24.

Time delay means are connected in series with lines $L_1$ and $L_2$ and in parallel with the run winding 26. Such time delay means comprise time delay relay 27 including relay winding 28, armature 30, contacts 29 and a dash pot mechanism. The dash pot mechanism includes a container 31 containing a fluid such as oil or silicone fluid. Piston 32 located within the container is connected to armature 30 and the piston divides the container into an upper and a lower chamber. Restricted passage 33 connects the upper and lower chambers respectively. Check valve 34 is mounted in orifice 32' in piston 32. The check valve opens to permit rapid downward movement of the piston and armature 28 and is closed during upward movement of the piston and armature. During the upward movement, all liquid flowing from the upper to the lower compartment must be ported through restricted passageway 33, thus imposing a time delay in the closing of contact 29. Adjustable valve means may be provided to vary the flow rate through the passage 33 and regulate the time needed to close contact 29 after energization of relay winding 28.

During operation a demand is made upon the refrigeration system thereby causing the starting device 16 to close, permitting energy to pass through the lines $L_1$ and $L_2$. Current passes through start winding 17, through run capacitor 18, and the overload protector 19 back to line $L_2$. At the same time current passes through relay winding 28 energizing the relay winding and drawing contact 29 upward. After a brief period on the order of one to six seconds depending upon the size of the restricted passageway 33, contact 29 closes and current is permitted to flow though the run or main winding 26. Thus, the abnormally high initial current drawn by the motor is reduced into a step demand upon the line.

The start capacitor 25 will shift the phase of the starting current with respect to the running current sufficiently to create adequate starting torque to rotate the motor shaft. Capacitor 25 is of considerable capacity. However, it is very often of a fragile nature and is required to be drawn off the line after a short interval so as to protect it from failure. To remove this capacitor 25 from the line a contact 24 is placed in the line of start capacitor 25 and made subject to a relay 22 whose armature opens contact 24 in response to voltage increase across winding 23 as the motor approaches running speed.

As the voltage picks up across the start winding, the voltage in the relay coil 23 also increases so that at a given voltage the relay breaks the contact 24 thereby cutting start capacitor 25 out of the circuit.

During normal operation of a similar type of induction motor not employing the present invention, the voltage across the winding 17 will be low initially and the current will be excessively high due to the fact that there is no induced electromotive force in the stator due to the stationary position of the rotor. As the rotor begins to turn due to the phase shift of the current in the start winding, the induced electromotive force increases to a sizeable quantity and the current in the circuit diminishes until the static condition is reached and the electromotive force is constant as determined by the amount of slip in the motor as further determined by the load thereof.

This condition also points out why high initial inrush currents occur in induction motors. In order to mollify the effect of the lack of counter electromotive force in the circuit it has been the practice to place a resistance in the stator circuit thereby decreasing the current draw initially on the motor. This type of device has been further refined by a series of resistors and the step starting effect is accomplished. This type of device has proved to be extremely expensive.

The present invention utilizes an inexpensive time delay means in parallel with the main or run winding. Initially the run winding circuit is open and current passes only through the start winding. After a predetermined delay, the relay winding 28 is energized and contact 29 is closed permitting energization of run winding 26 in the normal manner. The starting arrangement of the present invention substantially reduces the starting current draw on the power lines.

As an example, a five-horsepower, 230-volt, 60-cycle, single-phase capacitor start motor might draw 100 amperes locked rotor current. It has been found that by virtue of the impedance in the conventional circuitry the current through the run winding alone is substantially 100 amperes at startup of the motor. By virtue of the present invention wherein the run winding is kept open for a brief period at startup, the start winding alone will draw about 30 amperes and then when contact 29 is closed energizing the motor in the normal fashion, the current will be increased to 100 amperes. By this means, the total inrush current is divided into increments; an arrangement which the power companies find preferable to the sudden application of the total inrush current.

Figure 3:
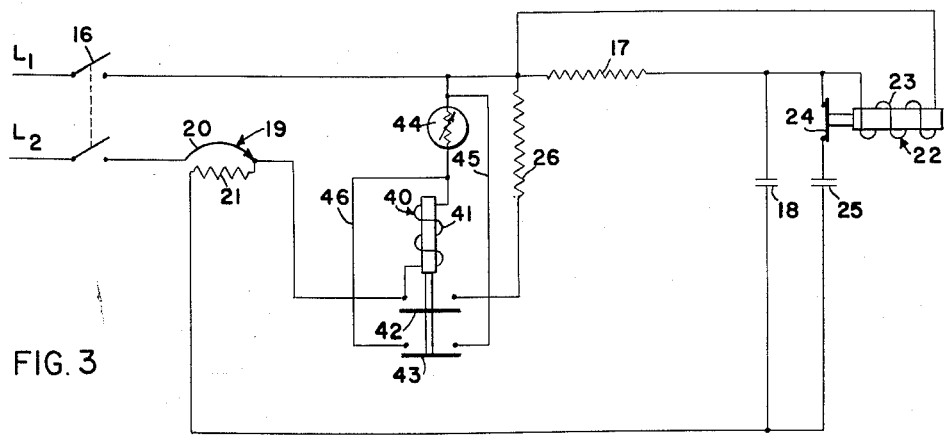
FIGURE 3 is a diagrammatic view of a modified version of the invention as illustrated in FIGURE 2.

Referring to FIGURE 3, there is shown a modified form of the present invention in which a thermistor is utilized in series with a relay winding to perform the function of delaying the energization of relay 40. Thermistor 44 is a resistor having a negative temperature coefficient of resistance. This particular characteristic causes the resistance of the element to decrease upon heating.

The time delay means includes a relay winding 41 normally open contact 42, normally open contact 43 and a thermistor 44 in series with relay winding 41.

In FIGURE 3, current is supplied to the motor through the lines $L_1$ and $L_2$ and through starting device 16 which responds to some refrigerant control indicating a need for refrigeration. As in the circuit of FIGURE 2, the start winding 17 and run capacitor 18 are in series with the power supply lines $L_1$ and $L_2$. Inasmuch as the contact 42 is open initially, current is drawn only through start winding 17, the run winding circuit being open. Some current flows through the thermistor 44 and as the thermistor heats up, more current is permitted to flow through the relay winding 41. After a predetermined time in the nature of one to six seconds, but preferably on the order of two to three seconds, the relay is energized sufficiently to close contacts 42 and 43. The closing of contact 42 permits current to flow through line $L_1$, run winding 26, contact 42, bimetal 20 to line $L_2$ permitting energization of the motor in the normal fashion.

In order to increase the phase shift of current passing through the start winding 17, a start capacitor 25 is placed temporarily in parallel with the run capacitor 18. Located in the circuit of the capacitor 25 is normally closed contact 24, which is opened by energization of relay winding 23 in response to voltage build up due to increase in electromotive force in the start winding.

A shorting circuit is provided around the thermistor 44. This circuit comprises the lines 45 and 46 together with contact 43. When relay winding 41 is energized, the contacts 42 and 43 are closed. Upon the closing of the contact 43, current may flow from line $L_1$ through line 45, contact 43, line 46, relay winding 41, and protector 19 to line $L_2$ thus shorting out the thermistor and preparing the same for another cycle of operation. The short circuiting of the thermistor accomplishes two things. It assures positive, quick and firm closing of the contacts by increasing the voltage across relay winding 41; secondly, it shunts the current around the thermistor so that it can cool rapidly to its initial state, restoring its high "cold" resistance, so that in the next cycle it will provide the same time delay.

Thus it is seen that the operation of the circuit of FIGURE 3 is substantially the same as the operation of the circuit of FIGURE 2. The thermistor is in effect a substitute for the dash pot mechanism illustrated in FIGURE 2, but is preferred for it is less expensive and more reliable in use.

It may be readily seen that by utilizing a time delay relay or a conventional relay in series with a thermistor in the circuiting of a capacitor motor, the great expense of conventional step starting devices may be avoided.

While the invention has been described in connection with a refrigerating system, it will be appreciated that it is suitable for use in other applications such as air compressors and other installations where a single-phase induction motor having a high starting torque is required.

While I have described a preferred embodiment of my invention, it will be understood the invention is not limited thereto since it may be otherwise embodied within the scope of the following claims.

I claim:

1. In a single-phase induction motor circuit adapted to be supplied with current, said circuit including a stator and a rotor cooperating therewith and inductively related thereto, the combination of a main winding, a start winding, and means for delaying energization of the main winding for an interval of time after energization of the start winding to provide application of starting current increments to the motor, said latter means including a relay having a contact in series with said main winding, a relay winding connected in parallel with said main winding and means for delaying the closing of said contact.

2. The single-phase induction motor circuit of claim 1, in which the delaying means includes a thermistor in series with the relay winding.

3. The single-phase induction motor circuit of claim 1 in which the relay means includes an armature and the delaying means includes a dash pot mechanism operatively connected to said armature.

4. The single-phase induction motor circuit according to claim 1, in which the start winding is connected in parallel with the main winding.

5. The single-phase induction motor circuit according to claim 1, in which a run capacitor is connected in series with said start winding, a start capacitor is connected in parallel with said run capacitor and means are provided for operatively removing the start capacitor from the circuit in response to a predetermined potential in the start winding.

6. In combination with a single-phase refrigerant compressor motor having a run winding and a start winding, a circuit adapted to supply current to said motor, said run winding being connected in series with said circuit, said start winding being connected to the circuit in parallel with said run winding, and a time delay relay having a relay coil connected in parallel with said run winding and a normally open switch connected in series with said run winding, said switch being closed a period of time after energization of the start winding and relay coil to permit energization of the run winding and provide increment starting of the motor.

7. The combination as set forth in claim 6, in which a run capacitor is connected in series with said start winding, a start capacitor is connected in parallel with said run capacitor, and means are provided for operatively removing the start capacitor from the circuit in response to a predetermined potential in the start winding.

8. In combination with a capacitor-type refrigerant compressor motor having a run winding and a start winding, apparatus for delaying the supply of current from the motor supply lines to the run winding comprising a time delay relay having a coil connected in parallel with the run winding and a normally open contact in series with the run winding, said contact being closed an interval of time after energization of the start winding to energize the run winding, thus reducing the initial surge of current to the motor.

9. In combination with a single-phase induction motor having a run winding and a start winding, apparatus for delaying the supply of current from the motor supply lines to the run winding comprising a normally open switch in series with said run winding, an armature for opening and closing said switch, a relay coil connected in parallel with said run winding for actuating said armature to open and close said switch and a thermistor connected in series with said relay coil.

References Cited in the file of this patent
UNITED STATES PATENTS

| | | |
|---|---|---|
| 1,484,046 | Wellington | Feb. 19, 1924 |
| 2,262,869 | Veinott | Nov. 18, 1941 |
| 2,629,537 | Graybook et al. | Feb. 24, 1953 |